US005799219A

United States Patent [19]

Moghadam et al.

[11] Patent Number: 5,799,219
[45] Date of Patent: Aug. 25, 1998

[54] SYSTEM AND METHOD FOR REMOTE IMAGE COMMUNICATION AND PROCESSING USING DATA RECORDED ON PHOTOGRAPHIC FILM

[75] Inventors: Omid A. Moghadam; Joseph DiVincenzo, both of Rochester; Dale F. McIntyre, Honeoye Falls; Edward Weissberger, Pittsford, all of N.Y.

[73] Assignee: Eastman Kodak Company, Rochester, N.Y.

[21] Appl. No.: 698,496

[22] Filed: Aug. 15, 1996

Related U.S. Application Data

[63] Continuation-in-part of Ser. No. 602,540, Feb. 20, 1996, abandoned.

[60] Provisional application No. 60/007,123, Oct. 26, 1995, and provisional application No. 60/007,077, Oct. 25, 1995.

[51] Int. Cl.[6] .................. G03B 17/24; G03B 29/00; H04N 1/387
[52] U.S. Cl. .................. 396/319; 396/429; 396/564; 355/40; 358/487; 358/527
[58] Field of Search .................. 396/310, 311, 396/319, 429, 564, 566; 355/40, 41, 77; 358/487, 527, 506, 508, 402, 407, 440, 442

[56] References Cited

U.S. PATENT DOCUMENTS

| | | | |
|---|---|---|---|
| 4,862,200 | 8/1989 | Hicks | 396/311 |
| 4,933,733 | 6/1990 | Shiota et al. | 358/302 |
| 5,036,344 | 7/1991 | Inoue et al. | 396/318 |
| 5,130,745 | 7/1992 | Cloutier et al. | 355/40 |
| 5,184,227 | 2/1993 | Foley | 358/302 |
| 5,231,506 | 7/1993 | Manico et al. | 358/302 |
| 5,258,859 | 11/1993 | Wada et al. | 358/427 |
| 5,319,401 | 6/1994 | Hicks | 355/40 |
| 5,327,265 | 7/1994 | McDonald | 358/527 |
| 5,400,152 | 3/1995 | Manico et al. | 358/487 |
| 5,420,699 | 5/1995 | Yamanouchi et al. | 358/487 |
| 5,440,401 | 8/1995 | Parulski et al. | 386/124 |
| 5,477,353 | 12/1995 | Yamasaki | 358/487 |
| 5,512,396 | 4/1996 | Hicks | 358/527 |
| 5,546,196 | 8/1996 | Huot et al. | 358/527 |
| 5,608,542 | 3/1997 | Krahe et al. | 358/487 |

FOREIGN PATENT DOCUMENTS

| | | | |
|---|---|---|---|
| 2286944 | 8/1995 | United Kingdom | G03B 27/73 |

*Primary Examiner*—A. A. Mathews
*Attorney, Agent, or Firm*—Thomas H. Close

[57] ABSTRACT

An automated film processing system, comprising: a film having at least one recordable section for storing at least one customer selected electronic address; a film finishing system for reading the electronic addresses recorded on said film, developing said film, digitizing the images developed on said film, and for transmitting the digitized images to the customer selected electronic addresses; and at least one customer station, remotely located from said film finishing system, said station electronically connected to said film finishing system for receiving and displaying the digitized images when addressed by said film finishing system. Photographs taken by a photojournalist are automatically communicated to a remotely located news agency by recording a telecommunication address for the remote location on the film. The data can be prerecorded on the film or recorded by the photographer before dispatching the film to a processor. At the processor, the developed film images are scanned and stored as image files. The address data, and any other data recorded by the photographer on the film is stored in a header appended to the image files. When the order is complete, a control computer at the processor automatically links to the remote image server via a telecommunications link based on address data in the file header. When the link is established, the image data is communicated to the remote server where image processing can be performed prior to making hard copy photoprints for publication. Other data recorded on the film can include such instructions as image scan resolution, color/tone scale calibration data, photolab identification and billing information.

24 Claims, 7 Drawing Sheets

PERSONAL DATA
- NAME
- STREET ADDRESS
- CITY    STATE   ZIP CODE
- ELECTRONIC ADDRESS ID
- ONLINE SERVICE PROVIDER

31

ELECTRONIC PREFERENCES — 33
- ☐ PHOTO CD - PULL IMAGE PAC
- ☐ VIDEO RESOLUTION ONLY
- ☐ OTHER FORMAT  [TIFF]
- ☐ MACINTOSH ☐ MACINTOSH
- ☐ OTHER PLATFORM  [UNIX]
- ☐ INDEX PRINT FILE
- ☐ PASSWORD REQUESTED

34

PAYMENT STATUS
- ☐ PROCESSING PAID - STORE PICKUP
- ☐ PROCESSING PAID - HOME DELIVERY
- ☐ PROCESSING PAID - ELECTRONIC DELIVERY
- ☐ FACTORY ENCODED PROCESSING DISCOUNT - AMOUNT  [$0.00]
- ☐ CREDIT CARD NO. [          ]  EXP. DATE [    ]

SYSTEM AND METHOD FOR REMOTE IMAGE COMMUNICATION AND PROCESSING USING DATA RECORDED ON PHOTOGRAPHIC FILM

CROSS REFERENCE TO RELATED APPLICATIONS

This application claims the benefit of U.S. Provisional application Ser. No. 60/007,077, filed Oct. 25, 1995, by O. Moghadam et al., entitled "System and Method for Remote Image Communication Using Data Recorded on Photographic Film", and is a Continuation in Part of U.S. application Ser. No. 08/602,540, filed Feb. 20 1996, by D. F. McIntyre et al., entitled "Automated Film Processing System", now abandoned which claims the benefit of U.S. Provisional application Ser. No. 60/007,123, filed Oct. 26, 1995, by D. F. McIntyre et al., entitled "Automated Film Processing System".

FIELD OF THE INVENTION

This invention relates to the field of photography, and in particular to communication of photographic images to a remote destination after processing of photographic film and for communicating with a customer of a file processing service for picture previewing and selection.

BACKGROUND OF THE INVENTION

In a traditional photofinishing operation, a customer brings in his/her film to be processed and printed. Several steps are necessarily taken by the customer to actually receive his/her finished prints where some of these steps are tedious, time consuming, and otherwise inconvenient. With the advent of networked processors it has become possible to enter a customer's home via the networked computer to permit a degree of interfacing with a film processing service provider. One such provider is America Online, Inc. which offers a service called PicturePlace. A customer provides the photoprocessing service with a source of developed pictures that are scanned and archived in a customer file that presently holds 100 pictures for a year at a nominal cost. Access to the customer's file may be selectively granted to others having a networked computer, for example, relatives and friends for viewing and downloading. In this same point in time at least one film manufacturer will provide a film cartridge that has at least one magnetic stripe associated with each frame on the film strip housed in the film cartridge for the purpose of exchanging information with film processing apparatus. An example of such is the invention disclosed in U.S. Pat. No. 5,130,745, entitled "Film Information Exchange System Using Dedicated Magnetic Tracks on Film", by Cloutier et al., which patent is assigned to Eastman Kodak Company the assignee to the present application.

It would be highly desirable to provide a system that permits the customer to record his/her electronic address on the film such that a film processor could almost instantly make available for viewing a digitized version of the images that have been developed from the customer's film and to additionally permit the customer to communicate print ordering instructions to the film processor which prints can be either picked up at a later convenient time or delivered by conventional means.

Additionally, photojournalists have two basic approaches available to creating and getting news event images to media for public dissemination. In one approach, the photojournalist may employ a digital electronic camera to capture a series of images which are temporarily stored either in the camera or in an auxiliary memory unit and later communicated by modem to the photojournalist's agency for reproduction into hard copy form. Such images are generally of lower quality than images captured on film and further, it requires that the photojournalist have access to a modem and telephone to communicate the digital images. Moreover, digital cameras are more costly than photographic cameras. At present, the use of photographic film for capturing news events is still paramount.

On the other hand, when using conventional cameras employing photographic film, the exposed film must be collected by a courier or dropped off at a film processing center for development into slides or prints and the slides or prints and the developed film must then be transported to the agency for proofing and preparation for use by the print media. This results in significant time delays that are particularly disadvantageous to the news media which is particularly concerned with getting news images into print in a timely manner. There is therefore a need for a system that combines the advantage of low cost and high image quality obtainable from the use of photographic film with the advantage of reduction in delay between the time of capturing the image and making the prints available to the print agency that is possible with telecommunication technology.

There has been proposed a photographic system which employs a magnetic data recording layer disposed on the reverse side of silver halide film. Such a system is described, for example, in commonly assigned U.S. Pat. No. 5,229,810, the disclosure of which is incorporated herein by reference. As described in this patent, data may be recorded on the film magnetic layer at the camera that indicates photographic parameters, such as exposure conditions, user identification and the like. Data may also be recorded by the film manufacturer to indicate film characteristics and other data may be recorded by the photofinisher to indicate film processing and print exposure conditions and the like. It is an object of the present invention to advantageously use the data recording capability of the this type of data recording on film system to facilitate the procedure for communicating film image data to a remote destination after the photographic film has been processed to produce visible images on the film.

SUMMARY OF THE INVENTION

The present invention is directed to overcoming one or more of the problems set forth above. Briefly summarized, according to one aspect of the present invention, there is provided an automated film processing system, comprising:

a film having at least one recordable section for storing at least one customer selected electronic address;

a film finishing system for reading the electronic addresses recorded on said film, developing said film, digitizing the images developed on said film, and for transmitting the digitized images to the customer selected electronic addresses; and at least one customer station, remotely located from said film finishing system, said station electronically connected to said film finishing system for receiving and displaying the digitized images when addressed by said film finishing system.

It is a primary object of the present invention to provide an interactive networked system that provides preview and ordering functions directly to a customer's network address.

Another object of the present invention is to provide an interactive networked system that enables a customer to download an index print, representing the images that are on a processed roll of film, so that the user may select and order which prints they would like to receive as hardcopy.

In accordance with another aspect of the invention, there is provided a system for remote image communication using data recorded on photographic film which comprises means for recording telecommunication data on the film, the telecommunication data including a remote destination address to which images on the film are to be transmitted by telecommunication means; means for scanning images on the film after development processing to produce digital image signals and for reading said telecommunication data from the film; and means responsive to said read telecommunication data for establishing a telecommunication link and for transmitting said digital image signals to said destination address.

AVANTAGEOUS EFFECT OF THE INVENTION

The present invention has the following advantages:

Photofinishing orders can be automatically shipped from the photofinishing point (wholesale or minilab) directly to the customer based on address information recorded on the film and order selection information electronically processed from the customer's home.

Photofinishing orders can be electronically previewed and selected by the customer and customer authorized viewers via electronic mail services available on the Internet.

The customer's camera may be programmed by the customer to write the customer's electronic address on each roll of film passing through the camera.

The present system provides for a reduction in the use of print paper and related processing chemicals as only the customer desired prints are printed.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
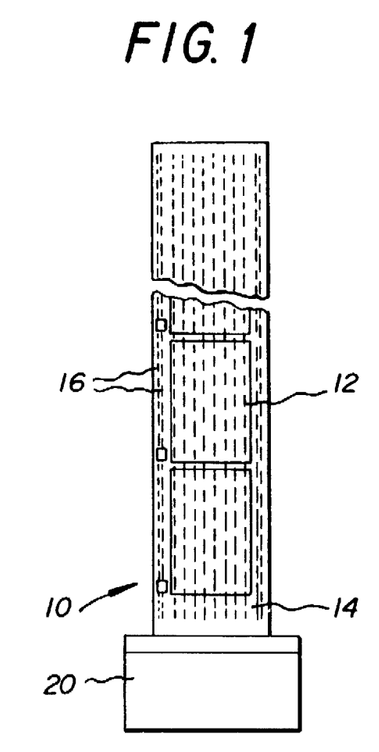
FIG. 1 illustrates a film cartridge of the type that houses a film strip having at least one data recording stripe thereon.

Referring to FIG. 1, a film cartridge 20 houses a strip of photographic film 10 having image capturing frames 12 along with a layer of transparent magnetic material 14 with assigned recording tracks 16 that are recorded on by a magnetic write head positioned within a camera. The camera write head and the camera are not shown in the present application for purposes of clarity, but are fully disclosed along with the cartridge and the film in U.S. Pat. No. 5,130,745, entitled, "Film Information Exchange System Using Dedicated Magnetic Tracks On Film" by Cloutier et al., which patent is assigned to Eastman Kodak Company the assignee of the present application.

Figure 2:
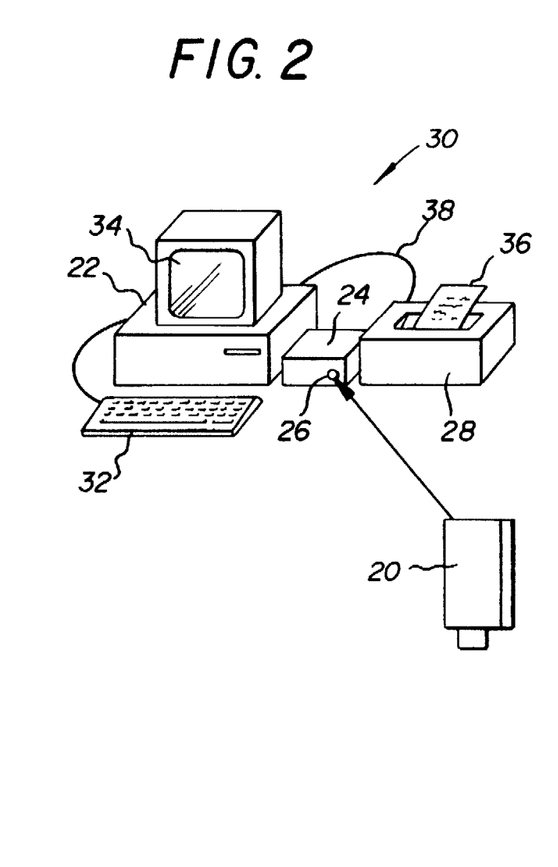
FIG. 2 illustrates an order entry workstation that is installed at a photofinishing center.

Referring now to FIG. 2, an order entry station 30 is configured with a computer workstation 22 including a monitor 34 and a keyboard 32. Also provided is a film strip reader 24 having a receptacle 26 for receiving the film cartridge 20. A photofinishing envelope printer 28 is connected to the computer workstation 22 by a bidirectional bus connection 38. A photofinishing envelope 36 is shown in printing position within the printer 28.

Figure 3:
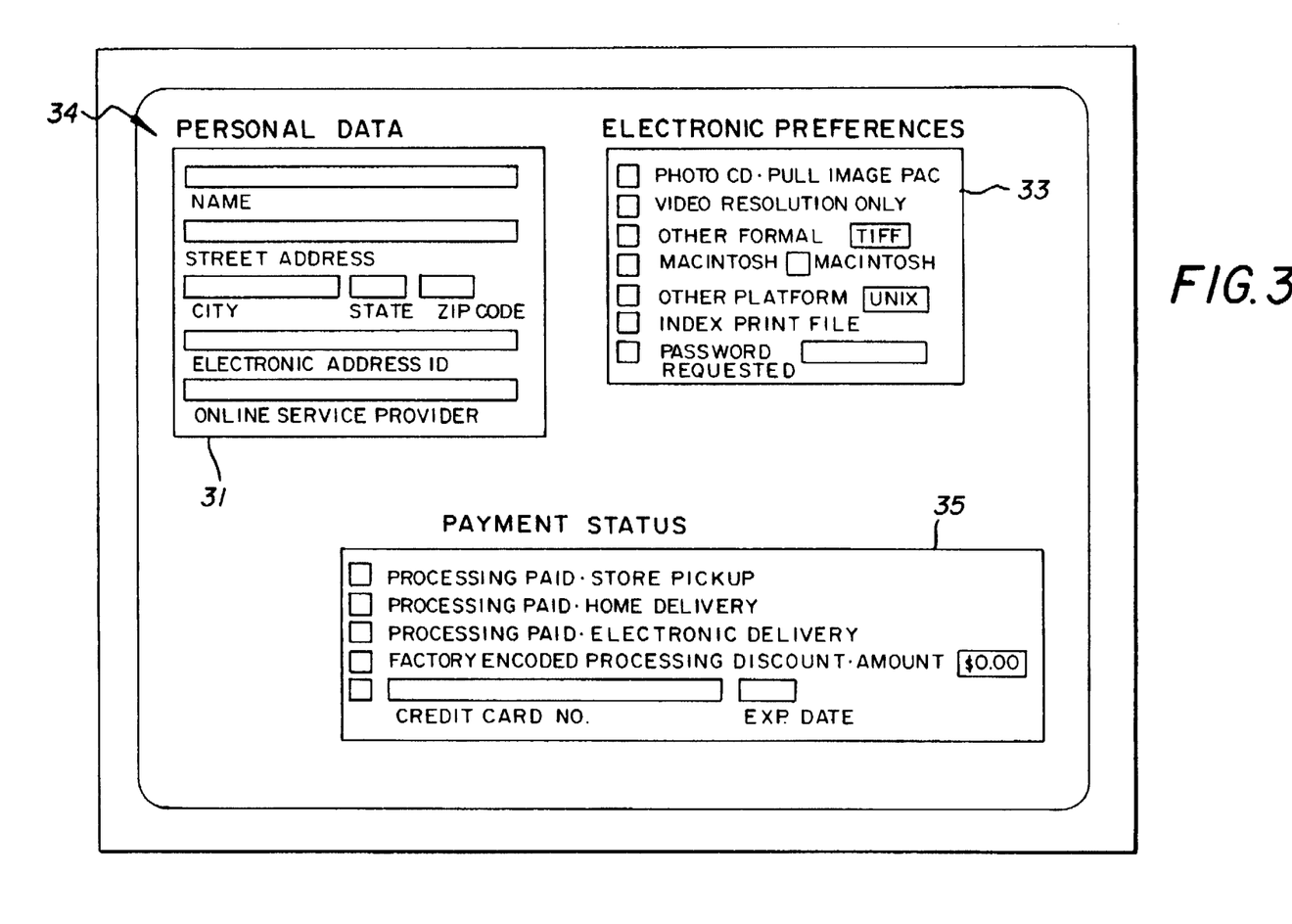
FIG. 3 illustrates a menu that appears on the monitor of the order entry workstation for viewing by a customer.

FIG. 3 illustrates the menu that is displayed on the monitor 34. A personal data section 31 is used to collect information about the customer's physical and electronic addresses. An electronic preferences section 33 is used by the customer to specify the electronic processing requested such as the index print file which is the main vehicle for viewing of the digital prints prior to hard copy print out. A payment status section 35 is used by the photofinisher to record payment status of the order.

An important feature of any reader/writer peripheral that is to be connected to this system such as film strip reader 24 is that it be light tight once the film cartridge 20 has been loaded. In this manner, customer information may be read from the magnetic tracks of the unprocessed film without exposing the film to unwanted light. That customer information and any supplemental information that the customer may enter by means of the keyboard 32 may be used, for example, to automatically print out the photofinishing envelope 36. The system disclosed in FIG. 2 of this application is disclosed as part of the system appearing in FIG. 10 of the U.S. Pat. No. 5,130,745, patent. The main point of difference is that in the present invention the customer's Internet address is read from the magnetic stripes of the film strip.

At the time the customer drops off their film for processing they could prepay for the processing including delivery of the finished order to their home via surface mail or via electronic notification. In this case, the payment status information could be written by the system 30 of FIG. 2. In that instance, the reader/writer 24 is used to add information to the magnetic stripes on film strip.

Figure 4:
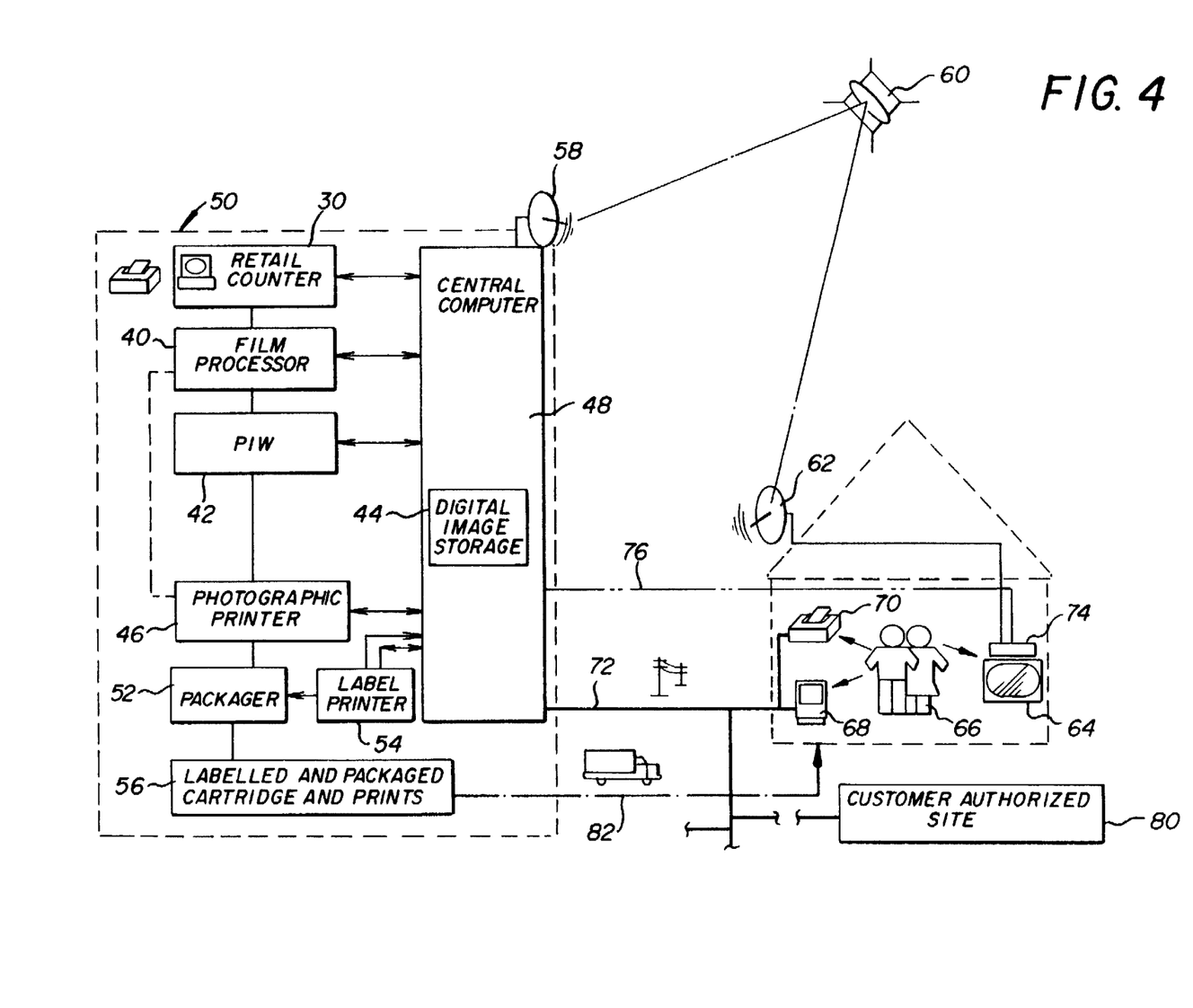
FIG. 4 is a pictorial diagram of the automated film processing system of the present invention.

Referring to FIG. 4, the photofinishing center 50 includes the order entry station 30 for inputting the film cartridge 20 and any customer instructions prior to film development. The next station within the photofinishing center 50 is the film processor(ing) 40 wherein the film is developed in the normal well known manner. Note at each of the stations there is a bidirectional bus connection 38 to a central computer 48. The developed film outputted from the film processor stage 40 is forwarded to a photo imaging workstation (PIW) 42 selected from one of a number of PhotoCD PIWs manufactured by Eastman Kodak Company for forming PhotoCD discs and prints. The PIW 42 is used to scan the developed film strip and to transform the images into hierarchical digital format. As part of that process a digital index file of low resolution digital prints is formed representing all of the scanned images appearing on the developed film strip. U.S. Pat. No. 5,184,227 entitled, "Photographic Printer With Index Print Generation" by Foley discloses a system that scans a film strip and forms a digital index print which print contains a plurality of images corresponding to the images on the film strip (at the output of his index print generator 44). The digital index print 84, at that point may be forwarded to a photographic printer 46 for hard copy generation. Similarly, In U.S. Pat. No. 5,400,152, entitled, "High Speed Index Printer" by Manico et al., there is disclosed a system for quickly scanning a film strip, digitizing the images scanned, and forming a digital index print file that is optically printed as a low resolution representation of the images appearing on the film strip.

A magnetic stripe reader, positioned within the film processor 40, senses the existence of an electronic address on a strip of film which means that the customer wants to preview the images on the film strip prior to having hard prints formed. Upon sensing the electronic address signal the film strip is forwarded to the PIW 42 for scanning (conversion to a digital form). The digital file, representing the images on the film strip and including the digital index file is forwarded to the central computer 48 for storage in a large scale, long term memory 44. If the film processor 40 does not sense an electronic address the digital file is forwarded, in the normal manner, to the photographic printer 46 for the printing of hard copy prints. The hard prints are then packaged in packager 52 and labeled by label printer 54. The original film cartridge 20 is associated with the labeled print package in block 56 and is optionally delivered to the customer by surface transportation 82 or picked up by the customer.

Upon receipt of the digital file the central computer 48 generates a message that is outputted on the hard wire communication channel 72 addressed to the customer 66. The customer 66, at a convenient time, accesses the hard wire communication channel 72 to be informed that the digital file is available for viewing on the monitor of the customer's home computer 68. The customer after viewing the digital index prints 84 can utilize the print screen capability of the home computer to generate a hard copy of the digital index prints 84 that in turn may be marked with a pen to indicate the customer's selections including size and quantity. The customer then Faxes the screen print out to the photofinisher for completion of the order using a standard FAX machine 70. The packaged order is then delivered to the customer using any convenient form of shipment. The customer is provided with the option of authorizing additional sites 80 for receipt of the electronic message and in turn the digital index prints 84. The customer is provided with the option of having the additional customer authorized site address incorporated onto the film magnetic tracks at the same time that the customer's address is written or the customer can indicate that the additional site(s) should be added at the retail counter 30, or that the additional site(s) should be added by so indicating on the document that is Faxed back to the photofinisher, or the customer may forward the digital index print file directly to the additional site(s).

The digital index print file, optionally, may be transmitted to the customer's TV 64, via TV broadcast channels, either by dishes 58 and 62 in conjunction with satellite 60, or by a cable 76, via an interface box 74 using the same technology now used by SEGA to transmit games to the customer's TV.

Figure 5:
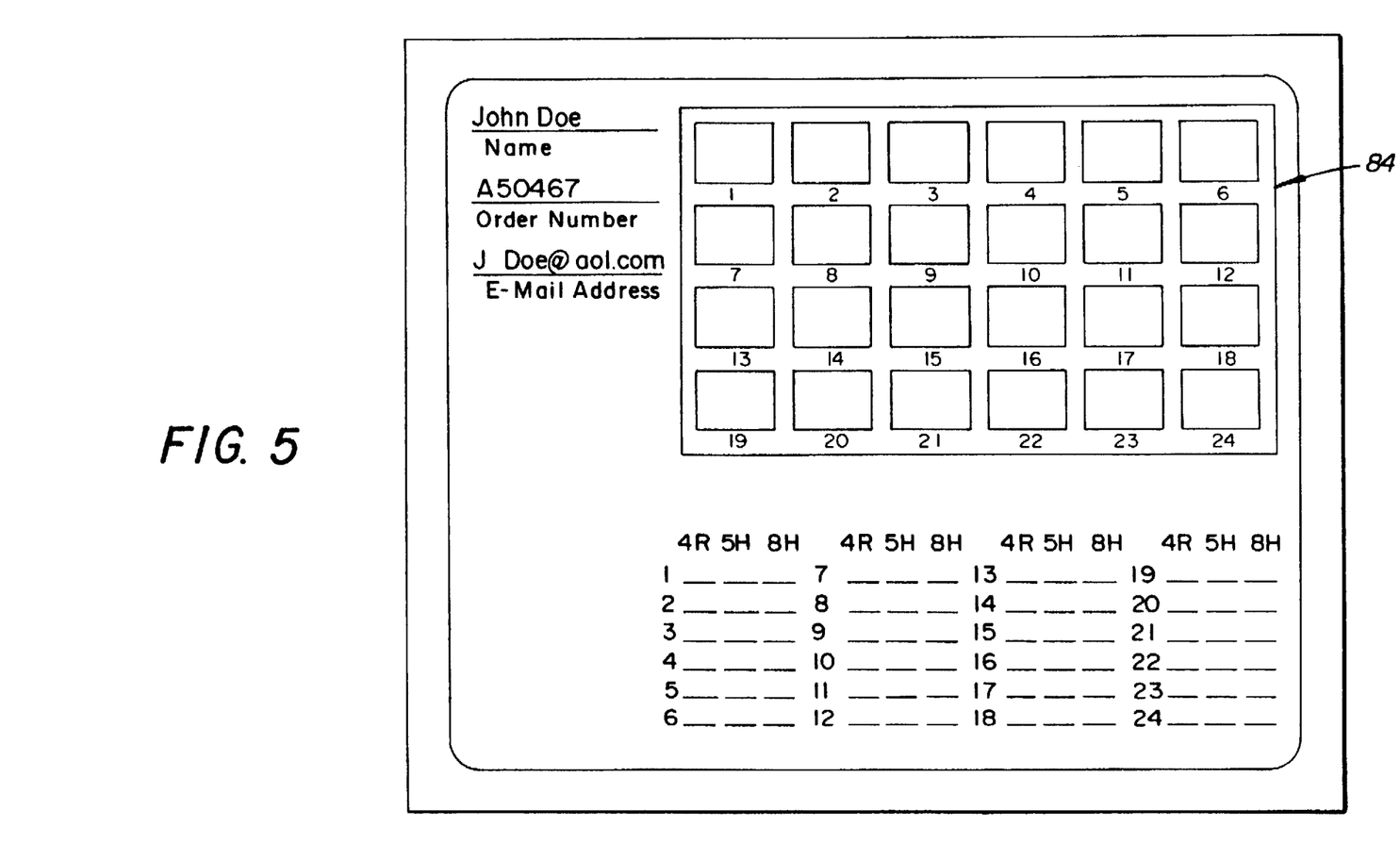
FIG. 5 is a menu that appears on the customer's remotely located home computer monitor or optional TV screen.

FIG. 5 illustrates the screen configuration that appears on home computer 68's monitor and optionally on the screen of the TV 64. The screen displays the digital index print 84, formed from the digital images that in turn were derived from the customer's developed film. In the arrangement shown the digital index print 84 is formed as a matrix of 24 low resolution digital images. Selection of the individual images along with their respective sizes (4X, 5X, 8X, etc.) and quantity is accomplished by the customer entering next to the respective image frame number the selection choices.

The present invention may also be used by photojournalists and news agencies to save time and reduce costs involved in photo coverage of news events. An important feature of the invention is that data is recorded on film specifying certain instructions pertaining to the images on the film, including at least the telecommunication address of a remote destination to which the images are to be sent electronically after the film has been developed. This remote destination may be the telecommunication address of the news agency image server.

This same process may be used by amateur photographers who may have home computers with telecommunications capability. Images scanned from processed film may be transmitted to a consumer's home computer using telecommunications means such as the Internet, direct-dial modem, or an electronic image mailbox on a telecommunication provider's image server. While the remote destination address is an important element of the recorded data, other data may also be recorded as will be described below.

Figure 6:
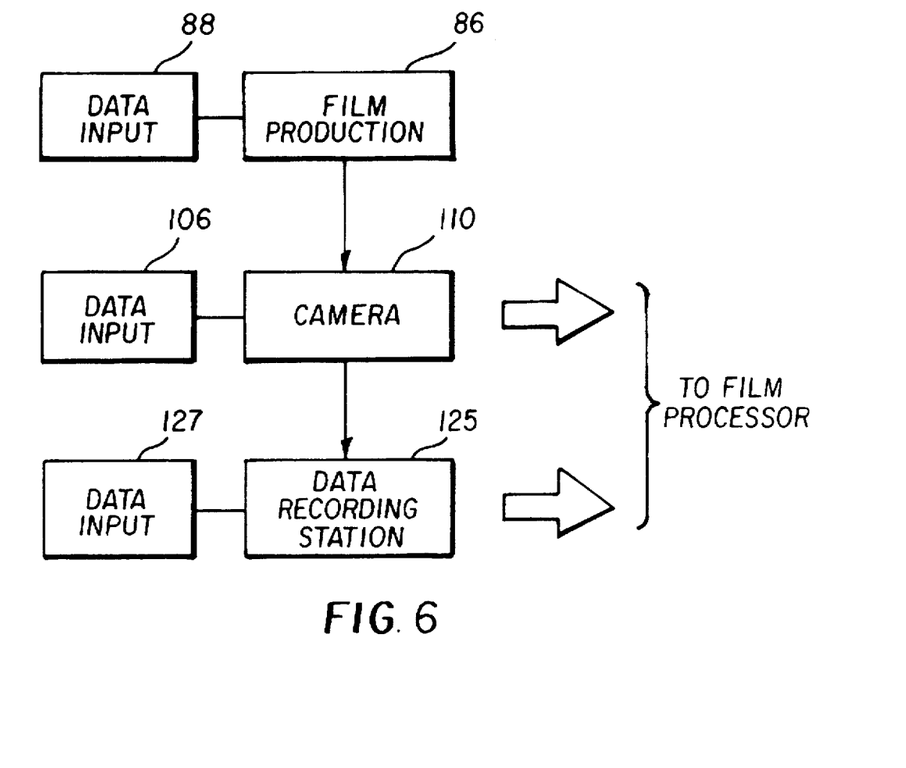
FIG. 6 is a block diagram illustrating alternative arrangements for recording data on film in accordance with an aspect of the invention.

Referring now to FIG. 6, alternative arrangements are shown for recording data on film as part of a photographic system in accordance with the invention. This data preferably is recorded at any one of several stages in the system prior to the exposed film being sent to a photofinishing processor.

Block 86 represents a film manufacturing process capable of producing photographic film with a magnetic data recording layer therein as described in the aforementioned '810 patent. Although the film may be produced and sold without any data magnetically recorded thereon, special orders for blocks of custom recorded film may be produced for large customer accounts, such as major print media agencies, with telecommunication address data inputted at data input block 88 and recorded on the entire batch of film included in the order. Other data, in addition to the agency image server telecommunication address, which may be recorded at the film manufacturing stage might include specifics of communication protocol and other information from the following list:

Agency name

Mailing address (to send hard copy prints)

Type of communication service desired (ATM, ISDN, etc.)

Image scanner control information (e.g. scan resolution)

Image resolution to be transmitted

Data compression ratio for image transmission

Communication flag (to indicate need for transmission service)

Billing information

Figure 7:
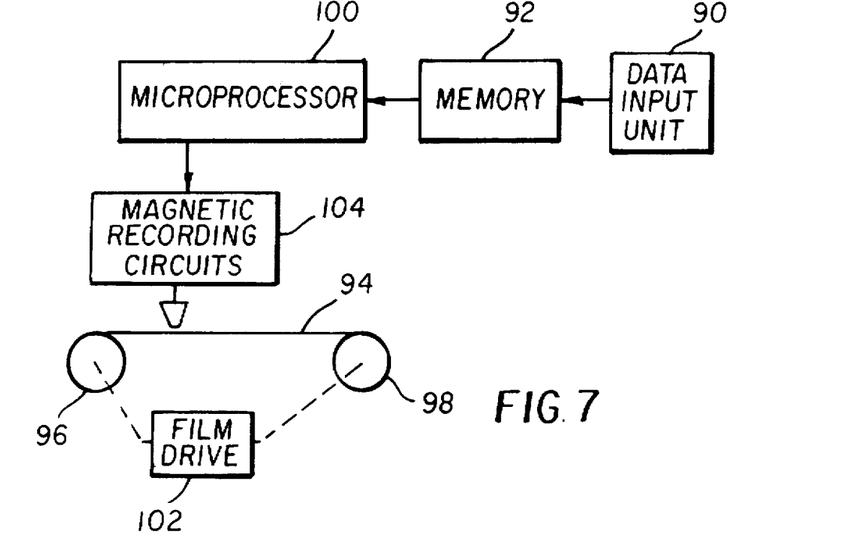
FIG. 7 is a block diagram of a data input recording unit useful either by a film manufacturer or by a photographer for recording data on film prior to being submitted to a film processor for development.

FIG. 7 illustrates an example of a data recording arrangement which may be used for this purpose. In this arrangement, data is entered via a data input unit 90, such as a manual keyboard or a data disk reader, and is buffered in memory 92. As the film with the magnetic layer is advanced from the film cartridge 96 to a film take-up reel 98 by film drive 102, the data is fetched from memory 92 by a microprocessor 100 and fed via magnetic recording drive circuits 104 to a magnetic recording head 112 for recording of the data on the film magnetic layer.

Figure 8:
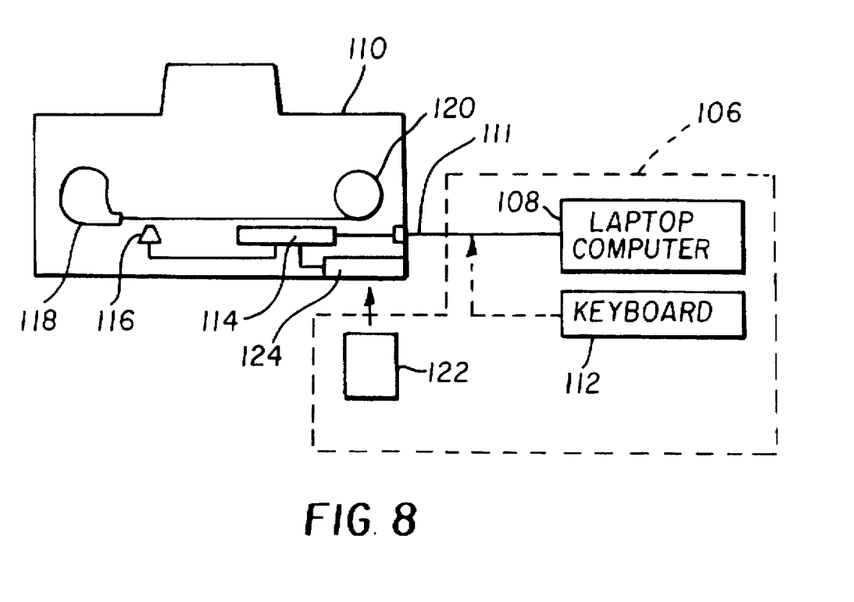
FIG. 8 is a schematic illustration of a data recording camera useful in the present invention.

Reverting to FIG. 6, telecommunication data also may be inputted, block 106, by the photographer for direct recording in a camera 110 equipped with magnetic recording capability. As seen in FIG. 8, a computer 108 (laptop or notebook type) is coupled via a cable 111 to an input terminal of camera 110. Data keyed in on keyboard 112, or read from a memory in computer 108, is fed to a microprocessor 114 in camera 110. The microprocessor operates to record the data via a magnetic recording head 116 on the film magnetic layer as the film is advanced from film cartridge 118 to take-up reel 120. Alternatively, the data may be read from a detachable magnetic card 122 inserted into a reader 124 in the camera. The data recorded by the photographer may be the data as itemized above, or, in the case of prerecorded film, it may be additional data that is unique to the photographer and the news event being covered. Such additional information might, for example, include the photographer's name, address and telephone number, assignment number, photo location, and text information concerning the photo images. information common to the entire roll of film may be recorded in data track located at the header or trailer portion of the film while information specific to individual images may be recorded in data associated with specific image frames on the film, all as described in the aforementioned '810 patent.

As a further alternative, again referring to FIG. 6, the photographer may record the telecommunication and other data, block 127, on the film in a separate recording station 125 prior to submitting the exposed cartridges for processing. Recording station 125 is essentially the same as the arrangement of FIG. 7 except that a cartridge receiving chamber would be provided for insertion of the film cartridge and engagement with the film drive mechanism.

Figure 9:
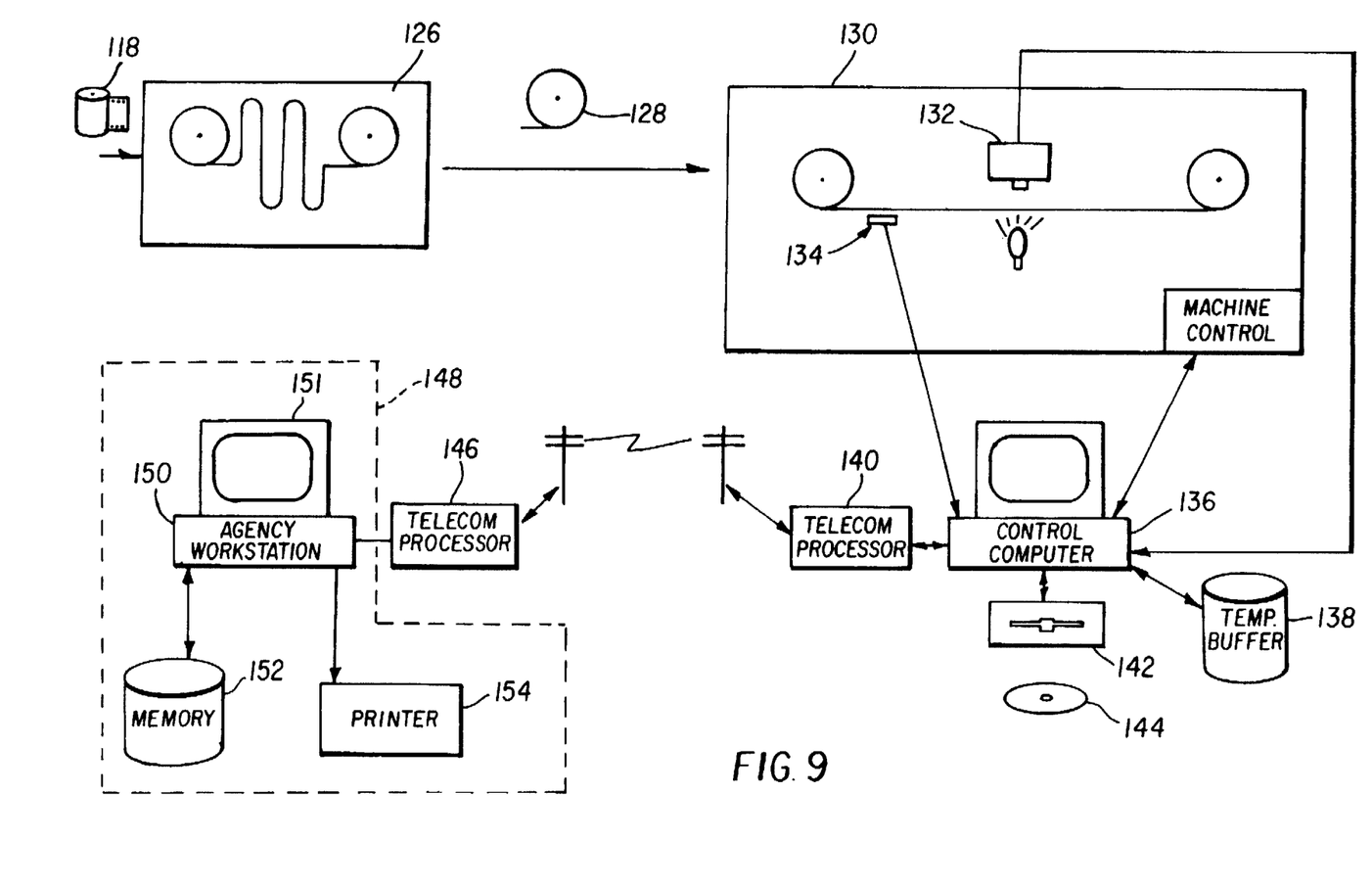
FIG. 9 is a schematic block diagram of an arrangement for photographic film processing and image data communication in accordance with another aspect of the present invention.

Referring now to FIG. 9, after the film has been exposed, the cartridge 118 (or batch of cartridges) with the data recorded on the film magnetic layer is taken by the photographer or a courier to a film development processor 126 for developing of the latent images on the film into visible images in a conventional manner. The developed film 128 is then placed in a film scanner and data reading unit 130 where the magnetically recorded data on the film 128, including the telecommunication data, is read from the film by magnetic read head 134 and the image frames are scanned by an optical film scanner 132 to produce digital image signals. A control computer 136 serves to receive the film recorded data and the scanned image data. Preferably, the recorded data is read before the images are scanned so that, if there are any scan control instructions recorded on the film, the computer 136 can control the image scanning. For example, data can be recorded on the film to control scan rates to set high or low scan resolution of the images and the degree of image data compression before transmission to the news agency. Additionally, the recorded data may be used to establish color correction processing instructions based on film type, data transmission protocol and other options, as well as to determine whether the images will be recorded on a CD ROM disc 144 by a CD writer/reader unit 142. Still further, specific scanner operating parameters may be communicated from the scanner to the control computer 136 along with the film recorded data. The control computer 136 then operates to append the recorded data and scanner operating data as a header to the scanned digital image files which are then stored in a temporary buffer memory 138 in preparation for communication to the remote destination.

At an appropriate time after the scanning of the film is completed, assuming there is telecommunication data in the assigned data fields on the film, the control computer 136 activates a telecommunications processor 140 to initiate contact via telecommunication link with a telecommunication processor 146 at a remote destination image server 148, i.e. the imager server located at the news agency for which the photographer is covering the assigned news event. The telecommunication server 140 automatically initiates the communication process to the receiver image server's processor 146 at the level designated by the data recorded on the film. The control computer determines the number of digital image files and their configuration from the magnetic data in the header and assembles a file for transmission to the remote image server 148. Additional information that may be recorded in the header as part of the header data may include source identifier (e.g. film processing lab) and source related image quality parameters. Examples of such additional data are:

Film processing lab name and address

Film processing lab network address (e.g. World Wide Web node)

Film type scanned

Film scanner color/tone scale calibration data

Billing information

Miscellaneous film order comments

Date, time and type of services provided

The image server 148 includes a computer workstation 150 which receives and stores the incoming image files in a memory unit 152. The workstation 150 also may be used to reproduce the images as soft copy images on a monitor 151. This allows the workstation operator to perform known types of image processing, such as cropping, sizing and color balancing prior to producing hard copy prints on printer 154. This may be done using algorithms stored in the workstation 150 or by accessing other digital image processing equipment (not shown) having the appropriate algorithms and processing capability. Alternatively, the soft copy images may be written with known "direct-to-plate" printing technology, bypassing generation of hard copy print proofs.

Advantages of this photographic system are that it provides automatic transmission of high quality digital images rapidly to the remote destination without manual operator intervention after film processing and bypasses the need to produce hard copy prints for separate delivery with the developed film to the destination. Additionally, since the images are in digital form for transmission, it avoids the need to scan the film at the destination. If the destination address data is recorded on the film at the manufacturing stage 86 or in the separate data recording station 125, it allows the photographer to use a conventional camera without the added cost of data recording equipment in the camera.

The invention has been described with reference to a preferred embodiment. However, it will be appreciated that variations and modifications can be effected by a person of ordinary skill in the art without departing from the scope of the invention.

PARTS LIST 10 photographic film
12 image capturing frames
14 transparent magnetic material
16 assigned recording tracks
20 film cartridge
22 computer workstation
24 film strip reader/writer
26 receptacle
28 printer 30 system/order entry station/retail counter
31 personal data section
32 keyboard
33 electronic preferences section
34 monitor
35 payment status section
36 photofinishing envelope
38 bi-directional bus connection
40 film processor
42 photo imaging workstation (PIW)
44 long term memory
46 photographic printer
48 central computer
50 photofinishing center
52 packager
54 label printer
56 label print package
58 dishes
60 satellite
62 dishes
64 TV
66 customer
68 home computer
70 standard FAX machine
72 hard wire communication channel
74 interface box
76 cable
80 additional sites
82 surface transportation
84 digital index print
86 film production process
88 data input
90 data input unit
92 memory
94 film with magnetic recording layer
96 film cartridge
98 film take-up reel
100 microprocessor
102 film drive
104 magnetic recording circuits
106 data input
108 computer
110 camera
111 cable
112 keyboard
114 camera microprocessor
116 magnetic recording head
118 film cartridge
120 take-up reel
122 magnetic data card
124 camera mag card reader
125 recording station
126 film development processor
127 data input
128 photoprocessed film roll
130 film scanner and data reading unit
132 optical film scanner
143 magnetic read head
136 control computer
138 temporary buffer
140 telecommunication processor
142 CD ROM writer/reader
144 CD ROM disk
146 telecommunication processor
148 remote destination image server
150 agency workstation computer
151 monitor
152 image server memory
154 printer

We claim:

1. An automated film processing system, comprising:

a film having at least one recordable section for storing at least one customer selected electronic address;

a film finishing system for reading the electronic addresses recorded on said film, developing said film, digitizing the images developed on said film, and for transmitting the digitized images to the customer selected electronic addresses; and at least one customer station, remotely located from said film finishing system, said station electronically connected to said film finishing system for receiving and displaying the digitized images when addressed by said film finishing system.

2. The automated film processing system according to claim 1 and further comprising:

a plurality of viewing stations, remotely located from said film finishing system, each station connected by a communication link to said film finishing system at a unique electronic address; and means for said customer to direct said film finishing system to transmit the digitized images to customer selected electronic addresses.

3. The automated film processing system according to claim 1 wherein said film finishing system further includes data entry means for receiving customer entered order information and customer selected electronic addresses.

4. The automated film processing systems according to claim 1 and further comprising:

means at the customer's remote location for selecting which digitized images are to be further processed by said film finishing systems; and means for communicating the selection to said film finishing systems.

5. The automated film processing system according to claim 4 wherein said film finishing system further comprises:

printer means for printing hard copy of selected digitized images; and means responsive to the communicated selection for activating said printer means to print the selected digitized images.

6. An automated film processing system, comprising:

a film having at least one recordable section for storing at least one customer selected electronic address;

a film finishing system for reading the electronic addresses recorded on said film, developing said film, digitizing the images developed on said film, and forming the digitized images into an index of digitized images, said film finishing system transmitting the index of digitized images to the customer selected electronic addresses; and at least on customer station, remotely located from said film finishing system, said station electronically connected to said film finishing system for receiving and displaying the index of digitized images when addressed by said film finishing system.

7. The automated film processing system according to claim 6 and further comprising:

a plurality of viewing stations, remotely located from said film finishing system, each station connected by a communication link to said film finishing system at a unique electronic address; and means for said customer to direct said film finishing system to transmit the index of digitized images to customer selected electronic addresses.

8. The automated film processing system according to claim 6 wherein said film finishing system further includes data entry means for receiving customer entered order information and customer selected electronic addresses.

9. The automated film processing system according to claim 6 and further comprising:

means at the customer's remote location for selecting which digitized images are to be further processed by said film finishing systems; and means for communicating the selection to said film finishing system.

10. The automated film processing system according to claim 9 wherein said film finishing system further comprised:

printer means for printing hard copy of selected digitized images; and means responsive to the communicated selection for activating said printer means to print the selected digitized images.

11. A system for remote image communication using data recorded on photographic film comprising:

means for recording data on the film, said data including telecommunication data representing at least a remote destination address to which images on the film are to be transmitted by telecommunication means;

means for scanning images on the film after development processing to produce digital image signals and for reading said telecommunication data from the film;

means responsive to said read telecommunication data for establishing a telecommunication link and for transmitting said digital image signals to said destination address.

12. The system of claim 11 further including a remote image server for receiving and processing said telecommunicated digital image signals.

13. The system of claim 12 wherein said remote image server includes a printer for reproducing said digital image signals in hard copy form.

14. The system of claim 11 wherein said recorded data includes at least one of a photographer identifier, image scanner control information, image resolution to be transmitted, data compression ratio for image transmission and communication protocol information.

15. Film handling apparatus for sorting out film orders for telecommunication to a remote destination; said apparatus comprising:

data reading means for reading data recorded on said film orders including telecommunication data identifying said remote destination;

scanner means for converting developed images on said film orders into digital image data signals; and controller means responsive to said telecommunication data on the film for establishing a telecommunication link and for transmitting said digital image signals to said destination address.

16. The film handling apparatus of claim 15 wherein said controller means is adapted to perform compression of said digital image data signals prior to transmission to said destination address.

17. The film handling apparatus of claim 15 wherein said recorded data includes additional data comprising at least one of a photographer identifier, image scanner control information, image resolution to be transmitted, data compression ratio for image transmission and communication protocol information; and said controller means is adapted to transmit said additional data to said remote destination.

18. The film handling apparatus of claim 15 wherein said scanner means is adapted to operate in accordance with predetermined operating parameters and said controller means is adapted to transmit at least some of said scanner operating parameters to said remote destination.

19. The film handling apparatus of claim 15 wherein said recorded data includes scanner control information and said controller means is operative to control operation of said scanner in accordance with recorded scanner control information.

20. The film handling apparatus of claim 19, said controller means further being operative to transit said scanner control information to said remote destination.

21. The film handling apparatus of claim 15 further including means for determining film type of the film in the order; and said controller means is adapted to transmit information indicating said film type to said remote destination.

22. The film handling apparatus of claim 15 wherein said recorded data includes image data compression control information and said controller means is operative to perform corresponding image data compression on said digital image data prior to communication to said remote destination.

23. The film handling apparatus of claim 22 wherein said controller means is adapted to transmit said image data compression control information to said remote destination.

24. A method of performing remote image processing and communication using data recorded on film comprising the steps of:

recording telecommunication data on a photographic film magnetic layer, said telecommunication data including at least a remote destination address to which images on the film are to be transmitted by telecommunication means;

processing said film to develop images exposed on the film;

scanning said images to produce digital image data;

reading said telecommunication data from the film magnetic layer;

establishing a telecommunication link to a remote destination address represented by said telecommunication data; and communicating said digital image data to said remote destination address.

* * * * *